United States Patent
Choi et al.

(10) Patent No.: US 9,803,101 B2
(45) Date of Patent: Oct. 31, 2017

(54) AQUEOUS VINYL ACETATE ETHYLENE COPOLYMER DISPERSION FOR PAPER COATING

(71) Applicant: WACKER CHEMIE AG, München (DE)

(72) Inventors: Yong Hae Choi, Suwon (KR); Jong Bok Kim, Busan (KR); Woo Jae Lee, Seoul (KR)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 15/129,247

(22) PCT Filed: Mar. 27, 2014

(86) PCT No.: PCT/KR2014/002587
§ 371 (c)(1),
(2) Date: Sep. 26, 2016

(87) PCT Pub. No.: WO2015/147352
PCT Pub. Date: Oct. 1, 2015

(65) Prior Publication Data
US 2017/0107394 A1    Apr. 20, 2017

(51) Int. Cl.
| | | |
|---|---|---|
| *D21H 19/56* | (2006.01) | |
| *C09D 131/04* | (2006.01) | |
| *C09D 5/02* | (2006.01) | |
| *C08K 3/26* | (2006.01) | |
| *C08K 3/34* | (2006.01) | |

(52) U.S. Cl.
CPC .......... *C09D 131/04* (2013.01); *C09D 5/027* (2013.01); *D21H 19/56* (2013.01); *C08K 3/346* (2013.01); *C08K 2003/265* (2013.01)

(58) Field of Classification Search
CPC . C08L 23/08539; C08L 23/0869; C09L 43/04
See application file for complete search history.

(56) References Cited

U.S. PATENT DOCUMENTS

| | | | |
|---|---|---|---|
| 2008/0098933 | A1 | 5/2008 | Killat |
| 2008/0214722 | A1* | 9/2008 | Petri ............... C08F 218/08 524/528 |
| 2012/0021237 | A1 | 1/2012 | Confalone |
| 2013/0253101 | A1 | 9/2013 | Ren |
| 2013/0338253 | A1* | 12/2013 | Krieger ............... C08K 5/5419 523/122 |

FOREIGN PATENT DOCUMENTS

| | | |
|---|---|---|
| EP | 0140227 A2 | 5/1985 |
| EP | 0381379 B1 | 10/1994 |
| EP | 1916275 A1 | 4/2008 |
| WO | 2012012231 A1 | 1/2012 |
| WO | 2013170411 A1 | 11/2013 |
| WO | 2014036740 A1 | 3/2014 |

OTHER PUBLICATIONS

Polymer Handbook, 2nd edition, J. Wiley & Sons, New York (1975).
Encyclopedia of Polymer Science arid Engineering, vol. 8 (1987), John Wiley & Sons, pp. 659 to 677.
Fox T.G., Bull. Am. Physics Soc. 1, 3 p. 123 (1956).
International search report of WO 2015/147352, dated Dec. 29, 2014.

* cited by examiner

*Primary Examiner* — Vu A Nguyen
(74) *Attorney, Agent, or Firm* — RatnerPrestia

(57) ABSTRACT

The invention relates to a polymer dispersion for paper coating compositions obtainable by means of a radically initiated, aqueous emulsion polymerization of a) 60 to 97% by weight of vinyl acetate, b) 2 to 30% by weight of ethylene, c) 0.5 to 5% by weight of at least one ethylenically unsaturated silane monomer, d) 0.5 to 5% by weight of at least one ethylenically unsaturated carboxylic acid, based in each case on the total weight of the monomers used for the polymerization, and the data in % by weight summing in each case to 100% by weight, in the presence of one or more polymeric emulsifiers.

14 Claims, No Drawings

AQUEOUS VINYL ACETATE ETHYLENE COPOLYMER DISPERSION FOR PAPER COATING

CROSS REFERENCE TO RELATED APPLICATIONS

This application is the National Phase filing of International patent application No. PCT/KR2014/002587, filed 27 Mar. 2014, the entirety of which application is incorporated herein by reference for all purposes.

TECHNICAL FIELD

The invention relates to a paper coating composition comprising a vinyl acetate ethylene copolymer dispersion.

BACKGROUND ART

Paper coating compositions are used in paper industry to provide various physical properties to paper. Generally paper is coated with paper coatings to improve the printability, and to improve smoothness and gloss of the paper surface, and in particular to improve whiteness. Such paper coatings generally comprise an aqueous polymer dispersion, one or more pigments and other additives typically used in paper coating formulations. Besides copolymers of styrene and butadiene and copolymers of styrene and acrylic acid ester, paper coating compositions with copolymers of vinyl acetate and ethylene (VAE) have become important.

During the offset printing process on coated paper, high levels of stress are experienced by the coating layer. This is a result of the increasing tack force developed by the ink layer as it loses its oil-based vehicle into the pore structure of the coating. When the tack force develops too quickly, or the coating strength is inadequate, the phenomenon of "dry pick" is observed, in which fragments of coating are removed by the ink. Additionally, in non-image areas of the print where aqueous fountain solution has been applied, the coating is weakened and subsequent printing with ink can cause removal of fragments of the coating, a phenomenon known as "wet pick". In consequence, in addition to the above mentioned basic qualities required in paper coatings, the paper coating composition must have high filler loading ability and high water resistance. Present binders on the basis of vinyl acetate ethylene latex dispersions do not show the desired properties.

In EP 0 140 227 A2 a pigmented paper coating composition is disclosed which comprises an aqueous polymer dispersion of vinyl acetate ethylene copolymers with copolymerized silane-functional comonomers and at least one comonomer out of the group comprising carboxyl-functional comonomers or amide-functional comonomers or polyethylenically unsaturated comonomers. These copolymers impart improved dry pick strength.

EP 0 381 379 B1 discloses a process of offset lithographic printing of paper wherein the paper is coated with a coating composition comprising an emulsion of a copolymer of a lower vinyl ester, ethylene, a vinyl ester of an alpha-branched monocarboxylic acid, and a polyunsaturated comonomer.

WO 2012/012231 A1 discloses a vinyl acetate ethylene latex which is stabilized with emulsifier and which is used in paper coating compositions. The object of this publication is the substitution of alkyl phenol ethoxylate emulsifiers in vinyl acetate ethylene dispersions. This problem has been solved with an interpolymer comprising vinyl acetate, ethylene, ethylenically unsaturated carboxylic acid, and polyethylenically unsaturated comonomer units, which is polymerized in the presence of anionic and/or nonionic emulsifiers.

WO 2013/170411 A1 discloses the use of vinyl acetate dispersions instead of styrene butadiene dispersions for avoiding emission of odor during its application. The vinyl acetate dispersion used is polymerized in the presence of a mixture of two different polyvinyl alcohols and of an alcohol ethoxylate emulsifier.

WO 2014/036740 A1 describes a paper coating composition comprising a vinyl ester ethylene copolymer with silane-functional comonomer units, and ionic comonomer units with sulfonic groups, or phosphonic groups or sulfate groups or phosphate groups.

SUMMARY OF INVENTION

The object of the present invention has been to provide an improved vinyl ester ethylene latex dispersion which impart high filler loading ability and water resistance.

The invention relates to a paper coating composition comprising from 50 to 99% by weight of the solids in the composition of one or more pigments, and from 1 to 50% by weight of the solids in the composition of a polymeric binder in form of a polymer dispersion obtainable by means of a radically initiated, aqueous emulsion polymerization of a) 60 to 97% by weight of vinyl acetate,
    b) 2 to 30% by weight of ethylene,
    c) 0.5 to 5% by weight of at least one ethylenically unsaturated silane monomer,
    d) 0.5 to 5% by weight of at least one ethylenically unsaturated carboxylic acid, based in each case on the total weight of the monomers used for the polymerization, and the data in % by weight summing in each case to 100% by weight, in the presence of one or more polymeric emulsifiers.

DETAILED DESCRIPTION OF INVENTION

The vinyl acetate monomer a) is copolymerized in general in an amount of 60% to 97% by weight, preferably 75% to 90% by weight, based in each case on the total weight of the monomers.

Ethylene monomer b) is copolymerized in general in an amount of 2 to 30% by weight, preferably 5% to 20% by weight, based in each case on the total weight of the monomers.

Examples of ethylenically unsaturated silane monomers c) are monomers of the general formula $R^1SiR_{0-2}(OR^2)_{1-3}$, where R has the definition $C_1$ to $C_3$ alkyl radical, $C_1$ to $C_3$ alkoxy radical or halogen (e.g., Cl or Br) $R^1$ has the definition $CH_2=CR^3-(CH_2)_{0-1}$ or $CH_2=CR^3CO_2(CH_2)_{1-3}$. $R^2$ is a unbranched or branched, optionally substituted alkyl radical or acyl radical having 1 to 12 C atoms, which may optionally be interrupted by an ether group, and $R^3$ stands for H or $CH_3$. Preference is given to 3-acryloyl- and 3-methacryloyloxypropyltri(alkoxy)silanes, vinylalkyldialkoxysilanes, and vinyltri-alkoxysilanes, having $C_1$ to $C_{12}$ alkoxy groups and optionally $C_1$ to $C_3$ alkyl radicals, with examples of $C_1$ to $C_{12}$ alkoxy groups that can be used being methoxy, ethoxy, methoxyethylene, ethoxyethylene, methoxypropylene glycol ether and/or ethoxypropylene glycol ether radicals, and also a-silanes. Particularly preferred are vinyltrimethoxysilane, vinyltriethoxysilane, vinyltripropoxysilane, vinyltriisopropoxysilane, vinyltributoxysilane, vinyltriacetoxysilane, 3-methacryloyloxypropyltrimethoxysilane, 3-methacryloyloxypropyltriethoxysilane, vinyltrichlorosilane, vinylmethyldichlorosilane, vinylmethyldichlorosilane, vinyl-tris(2-methoxyethoxysilane), trisacetoxyvinylsilane. Ethylenically unsaturated silane monomers that are most preferred are vinyltrimethoxysilane, vinyltriethoxysilane, 3-methacryloyloxypropyltrimethoxysilane, 3-methacryloyloxy-propyltriethoxysilane.

The fraction of ethylenically unsaturated silane comonomer is 0.5% to 5% by weight, more preferably 0.5% to 2% by weight, based in each case on the total weight of the monomers.

Examples of ethylenically unsaturated carboxylic acid comonomers d) are ethylenically unsaturated monocarboxylic and dicarboxylic acids or salts or anhydrides thereof, preferably acrylic acid, methacrylic acid, fumaric acid, maleic acid, and maleic acid anhydride. The fraction of ethylenically unsaturated carboxylic acid comonomer is 0.5% to 5% by weight, more preferably 0.5% to 2% by weight, based in each case on the total weight of the monomers.

For the adjustment of certain polymer properties further auxiliary comonomers e) may be copolymerized. Examples are ethylenically unsaturated sulfonic acids and/or salts thereof, preferably vinyl sulfonic acid and 2-acrylamido-2-methypropane sulfonic acid and the salts thereof.

In a further preferred embodiment polyethylenically unsaturated comonomers like diallyl maleate or triallyl cyanurate are not copolymerized. In a further preferred embodiment amides, N-alkylol amides or N-alkoxyalkyl amides of ethylenically unsaturated carboxylic acids are not copolymerized.

The monomer selection and the selection of the weight fractions of the comonomers are made such that preferably the result is a glass transition temperature Tg of −10° C. to +20° C. The glass transition temperature Tg of the polymers can be determined in a known way by means of differential scanning calorimetry (DSC) with a heating rate of 10 K per minute according to ASTM D3418-82 as midpoint temperature. The Tg may also be calculated approximately in advance using the Fox equation. According to Fox T. G., Bull. Am. Physics Soc. 1, 3 page 123 1956) the following is the case: $1/Tg=x1/Tg1+x2/Tg2+ \ldots +xn/Tgn$, where xn stands for the mass fraction (% by weight/100) of the monomer n, and Tgn is the glass transition temperature, in kelvins, of the homopolymer of the monomer n. Tg values for homopolymers are listed in Polymer Handbook, 2nd edition, J. Wiley & Sons, New York (1975).

The vinyl acetate ethylene copolymer dispersions are produced via an aqueous, radically initiated emulsion polymerization using conventional emulsion polymerization procedure. Such a procedure is described for many time and known to the skilled person, for example in Encyclopedia of Polymer Science and Engineering, Vol. 8 (1987), John Wiley & Sons, pages 659 to 677 or for example in EP 1916275 A1. In general the polymerization takes place in pressure reactors at a temperature of 50° C. to 120° C. under a pressure of 10 to 90 bar abs.

The polymerization is in general initiated using the redox initiator combinations that are customary for emulsion polymerization. Examples of suitable oxidation initiators are the sodium, potassium, and ammonium salts of peroxodisulfuric acid, hydrogen peroxide, t-butyl hydroperoxide, cumene hydroperoxide, isopropylbenzene monohydroperoxide. Preference is given to the sodium, potassium, and ammonium salts of peroxodisulfuric acid and to hydrogen peroxide. The stated initiators are used in general in an amount of 0.01% to 2.0% by weight, based on the total weight of the monomers.

The stated oxidizing agents, more particularly salts of peroxodisulfuric acid, may also be used on their own as thermal initiators.

Suitable reducing agents are the sulfites and bisulfites of the alkali metals and of ammonium, as for example sodium sulfite, the derivatives of sulfoxylic acid such as zinc sulfoxylates or alkali metal formaldehyde sulfoxylates, as for example sodium hydroxymethanesulfinate (Bruggolit), and (iso)ascorbic acid. It is preferred to use sodium hydroxylmethanesulfinate and sodium sulfite. The amount of reducing agent is preferably 0.015% to 3% by weight, based on the total weight of the monomers.

For controlling the molecular weight it is possible to use regulating substances during the polymerization. If regulators are used, they are employed typically in amounts between 0.01% to 5.0% by weight, based on the total weight of the monomers to be polymerized, and are metered separately or else as a premix with reaction components. Examples of such substances are n-dodecyl mercaptan, tert-dodecyl mercaptan, mercaptopropionic acid, methyl mercaptopropionate, isopropanol, and acetaldehyde. It is preferred not to use any regulating substances.

The emulsion polymerization used to prepare the polymer dispersion is carried out in the presence of one or more polymeric emulsifiers. Polymeric emulsifiers mean, that the emulsifiers have polyoxyalkylene groups with at least 3 alkylene oxide units. The emulsifiers used are preferably combinations with at least one nonionic polymeric emulsifier and at least one anionic polymeric emulsifier, wherein both the nonionic polymeric emulsifier and the anionic polymeric emulsifier have polyoxyalkylene units with at least 3 alkylene oxide units, and wherein the alkylene oxide units are ethylene oxide and/or propylene oxide units.

Suitable nonionic polymeric emulsifiers with polyoxyalkylene units with at least 3 alkylene oxide units are, for example, ethoxylated mono-, di-, and tri-alkylphenols having a degree of ethoxylation of 3 to 50 ethylene oxide units and $C_4$- to $C_{12}$-alky radicals; and also ethoxylated fatty alcohols having a degree of ethoxylation of 3 to 80 ethylene oxide units and $C_8$- to $C_{36}$-alkyl radicals. Suitable nonionic emulsifiers are also $C_{13}$- to $C_{15}$-oxo-process alcohol ethoxylates having a degree of ethoxylation of 3 to 30 ethylene oxide units, $C_{16}$- to $C_{18}$-fatty alcohol ethoxylates having a degree of ethoxylation of 11 to 80 ethylene oxide units, $C_{10}$-oxo-process alcohol ethoxylates having a degree of ethoxylation of 3 to 11 ethylene oxide units, $C_{13}$-oxo-process alcohol ethoxylates having a degree of ethoxylation of 3 to 20 ethylene oxide units, polyoxyethylenesorbitan monooleate having 20 ethylene oxide groups. Further examples are copolymers of ethylene oxide and propylene oxide with a minimum content of at least 10% by weight of ethylene oxide, polyethylene oxide ethers of oleylalcohol, having a degree of ethoxylation of 4 to 20 ethylene oxide units, and also the polyethylene oxide ethers of nonylphenol, having a degree of ethoxylation of 4 to 20 ethylene oxide units.

Particularly preferred are $C_{12}$- to $C_{14}$-fatty alcohol ethoxylates having a degree of ethoxylation of 3 to 20 ethylene oxide units, and copolymers of ethylene oxide and propylene oxide with a minimum content of at least 10% by weight of ethylene oxide.

Examples of suitable anionic polymeric emulsifiers with polyoxyalkylene units with at least 3 alkylene oxide units are sodium, potassium, and ammonium salts of sulfosuccinic 4-esters with polyethylene glycol ethers of monohydric aliphatic alcohols having 10 to 12C atoms, more particularly their disodium salts, and of sulfosuccinic 4-ester with polyethylene glycol nonylphenyl ether, more particularly its disodium salt. Further examples are $C_1$- to $C_{15}$-esters of phosphoric acid ethoxylated with 4 to 20 ethylene oxide units.

The amount of emulsifier is 3% to 12.5% by weight, preferably 3% to 7% by weight, based in each case on the total weight of the monomers.

Preferably protective colloids are not used as surface-active compounds.

The polymerization can be carried out discontinuously or continuously, with or without the use of seed latices, with initial introduction of all the constituents or individual constituents of the reaction mixture, or with initial introduction of a portion and subsequent metering of the constituents or individual constituents of the reaction mixture, or by the metering method without an initial mixture. All the meterings are preferably carried out at the rate of consumption of the particular component.

For example, at least a part of the surfactants and at least a part of the comonomers a), b), c), d) maybe added initially. The reaction mixture is heated and polymerization is initiated by metering the initiator components. The remaining part of the comonomers can be added during polymerization.

After conclusion of the polymerization, a post-polymerization can be carried out according to known methods to remove residual monomers, in general by post-polymerization initiators using a redox catalyst. Volatile residual monomers can also be removed by means of distillation, preferably under reduced pressure, and, if appropriate, passing inert entraining gases such as air, nitrogen or steam through or over the reaction mixture.

The aqueous copolymer dispersions which can be obtained in this way have a solids content of from 30 to 75% by weight, preferably from 50 to 60% by weight.

The particles of the copolymer dispersion have a narrow particle size distribution having a mean particle size less than 1 μm, typically in a range from 0.1 to 0.3 μm. This particle size allows for good paper coating rheology and provides a high surface area for pigment-to-pigment and pigment-to-paper binding strength.

Preparation of paper coatings with the binders disclosed herein may be according to formulation principles generally known in the art. The proportion of the formulation components in paper coatings is typically expressed relative to 100 parts of pigment. Suitable pigments include polymeric pigments, aluminosilicates (for example clay or kaolin), calcium carbonate, titanium dioxide, talc, barium sulfate, zinc oxide, aluminum trihydrate, amorphous silica and silicates. Preferably kaolin and/or calcium carbonate. The polymeric binder constitutes from 1 to 50% by weight of the solids in the composition, more typically 3 to 22% by weight. The pigment(s) constitute(s) from 50 to 99% by weight of the solids in the composition, more typically 78 to 97% by weight.

Other components of the formulation may include dispersants such as sodium polyacrylates, lubricants such as fatty acid salts (e.g. stearates), optical brighteners as diaminostilbene disulfonic acid derivates, cobinders, defoamers, preservatives and water.

To prepare the paper coating compositions, the pigment is added as an aqueous pigment slurry and mixed with the binder dispersion, the other additives and water.

Application of paper coating composition to the substrate may be made with any of the usual coating devices such as blade coaters, roll coaters, air knife coaters, rod coaters and scrapers. Any support material may be coated, and typical suitable support materials include paper and cardboard.

The paper coating compositions of the invention are typically used to cover entirely at least one side of a sheet or web of paper, and may cover both sides entirely, although coverage of the entire surface is not essential. The compositions may further include polymeric dispersions other than the above-described vinyl acetate ethylene copolymers, for example vinyl acrylic copolymers, styrene butadiene copolymers, acrylic polymers, vinyl acetate homopolymers, and the like.

BEST MODE FOR CARRYING OUT THE INVENTION

EXAMPLES

Comparison Example 1

In a pressure reactor 35 g of a sulfosuccinate alkyl glycol surfactant (HY-290PG of Hannong Chemicals), 2 g sodium acetate and 2 g acetic acid were dissolved in 3660 g of water, and the pH of this solution was adjusted to pH=4-5. To this solution 0.2 g ferrous ammonium sulfate dissolved in 3 g water was added. The reactor was purged with nitrogen and 1115 g vinyl acetate and 1048 g ethylene were added into the reactor.

In a separate step 870 g water, 118 g of a nonionic polyoxyethylene polyoxypropylene surfactant (Koremul-LPE-740-1 of Hannong Chemicals), 78 g of a phosphate surfactant (Koremul TP-170), 20 g of a sodium hydroxide solution (50% in water), 77 g of the sodium salt of 2-acrylamide-2-methylpropanesulfonic acid were admixed, and the pH was adjusted to pH=3.7-4.3 (Solution 1).

In a separate step 17 g sodium persulfate and 2 g sodium carbonate were dissolved in 282 g water (Ox-solution)

In a separate step 11.3 g sodium erythorbate was dissolved 332 g water (Red-solution).

After the initial charging the reactor was under agitation to 55° C. After reaching this temperature, for initiating polymerization, simultaneously feeding of the Ox-solution and of the Red-solution was started and continued for 2 hours at a speed of 80 g/h. Two minutes after the start of initiator feeding, the continuous feed of vinyl acetate monomer was started with a rate of 62 g/min for 90 min. Simultaneously with the vinyl acetate feed the continuously feeding of the functional monomer feed (solution 1) was started at a rate of 12 g/min for 90 min.

After the stop of the polymerization post-polymerisation was performed with a solution of 14 g t-butylhydroperoxide in 72 g water, and with 8 g sodium erythorbate in 92 g water.

The characteristic of the product obtained is listed in table 1.

Comparison Example 2

The process of Comparison Example 1 was followed except additional 33 g of acrylic acid were added with solution 1.

The characteristic of the product obtained is listed in table 1.

Comparison Example 3

The process of Comparison Example 1 was followed except additional 66 g of acrylic acid were added with solution 1.

The characteristic of the product obtained is listed in table 1.

Comparison Example 4

The process of Comparison Example 1 was followed except additional 99 g of acrylic acid were added with solution 1.

The characteristic of the product obtained is listed in table 1.

Example 5

The process of Comparison Example 3 was followed except additional 22 g of vinyltrimethoxysilane were added with solution 1.

The characteristic of the product obtained is listed in table 1.

Example 6

The process of Comparison Example 3 was followed except additional 44 g of vinyltrimethoxysilane were added with solution 1.

The characteristic of the product obtained is listed in table 1.

Example 7

The process of Comparison Example 3 was followed except additional 66 g of vinyltrimethoxysilane were added with solution 1.

The characteristic of the product obtained is listed in table 1.

TABLE 1

| Example | Solid contents (%) | Tg (° C.) | Vinyl acetate (%) | Ethylene (%) | Acrylic acid (%) | Vinyl silane (%) | AMPS (%) |
|---|---|---|---|---|---|---|---|
| Comp. Ex. 1 | 50.4 | 12.9 | 88.5 | 10.5 | 0.0 | 0.0 | 1.0 |
| Comp. Ex. 2 | 50.0 | 13.5 | 88.5 | 10.0 | 0.5 | 0.0 | 1.0 |
| Comp. Ex. 3 | 50.6 | 13.4 | 88.0 | 10.0 | 1.0 | 0.0 | 1.0 |
| Comp. Ex. 4 | 50.4 | 13.7 | 88.0 | 9.5 | 1.5 | 0.0 | 1.0 |
| Example 5 | 50.8 | 13.8 | 88.0 | 9.5 | 1.0 | 0.5 | 1.0 |
| Example 6 | 49.8 | 12.5 | 87.75 | 9.5 | 1.0 | 0.75 | 1.0 |
| Example 7 | 50.1 | 12.1 | 87.5 | 9.5 | 1.0 | 1.0 | 1.0 |

Preparation of Coated Printing Paper:

The dispersions obtained in the examples and in the comparison examples were tested in the following paper coating composition:

90 parts by weight of $CaCO_3$ (Hydrocarb 90 of OMYA)
10 part by weight of Clay (Hydragloss 91 of KaMin LLC)
10 parts by weight of polymer dispersion (50% solids)

Water was added to adjust a solids content of about 64 to 65%.

The paper coating compositions obtained were coated onto a white paperboard surface using a calendar at a coat weight of 13 to 15 g/m' and dried in an oven for 20 seconds at 140° C.

Testing:
Gloss:

1.2 g of blue ink with a tack value of 10 were applied to the coated paper with the applicator roll of a RI printer device. After drying at room temperature (about 23° C.) and at a humidity of 40% to 60% for one day. The gloss of the surface of the coated printing paper was determined with the glossmeter Micro-Tri-Gloss of BYK Gardner at an angle of 60°.

The results are listed in table 2.

Dry Pick Strength and Wet Pick Strength:

For the testing of dry pick strength 1.3 g of red ink with a tack value of 14 was applied with the applicator roll of a RI printing device to the coated printing paper.

For the testing of wet pick strength 0.5 g of red ink with a tack value of 14 was applied with the applicator roll of a RI printing device to the coated printing paper, which was wetted before printing with a wet cotton roll.

The bonding strength as well dry pick strength as wet pick strength was determined after printing. The results listed in table 2 were evaluated qualitatively by naked eye on the picked surface. 5.0 is the best rating. Lower rates are worse.

TABLE 2

| Example | Gloss on printing paper (5) | Bonding strength Dry Pick | Bonding strength Wet Pick |
|---|---|---|---|
| Comp.Ex. 1 | 94.7 | 3.9 | 3.1 |
| Comp.Ex. 2 | 95.3 | 4.1 | 3.2 |
| Comp.Ex. 3 | 92.2 | 4.1 | 3.2 |
| Comp.Ex. 4 | 92.5 | 4.3 | 3.0 |
| Example 5 | 96.3 | 4.1 | 3.7 |
| Example 6 | 95.2 | 4.3 | 4.3 |
| Example 7 | 95.1 | 4.2 | 4.3 |

The results clearly indicate that with the inventive copolymer dispersion coating quality is improved. Particularly wet pick strength is significantly improved.

The invention claimed is:

1. A paper coating composition comprising from 50 to 99% by weight of the solids in the composition of one or more pigments, and from 1 to 50% by weight of the solids in the composition of a polymeric binder in the form of a polymer dispersion obtained by a radically initiated, aqueous emulsion polymerization, in the presence of one or more polymeric emulsifiers, of
    a) 60 to 97% by weight of vinyl acetate,
    b) 2 to 30% by weight of ethylene,
    c) 0.5 to 5% by weight of at least one ethylenically unsaturated silane monomer, and
    d) 0.5 to 5% by weight of at least one ethylenically unsaturated carboxylic acid comonomer,
    based in each case on the total weight of the monomers used for the polymerization, and the data in % by weight summing in each case to 100% by weight,
    wherein the coating composition is present as a coating on a paper support material.

2. The paper coating composition of claim 1, wherein the ethylenically unsaturated silane monomer(s) c) is/are of the general formula $R^1SiR_{0-2}(OR^2)_{1-3}$, wherein R has the definition $C_1$ to $C_3$ alkyl radical, $C_1$ to $C_3$ alkoxy radical or halogen, $R^1$ has the definition $CH_2=CR^3\text{-}(CH_2)_{0-1}$ or $CH_2=CR^3CO_2(CH_2)_{1-3}$, $R^2$ is a unbranched or branched, optionally substituted alkyl radical or acyl radical having 1 to 12 C atoms, which may optionally be interrupted by an ether group, and $R^3$ stands for H or $CH_3$.

3. The paper coating composition of claim 1, wherein the ethylenically unsaturated carboxylic acid comonomer(s) d) is/are ethylenically unsaturated monocarboxylic or dicarboxylic acids, or salts or anhydrides thereof.

4. The paper coating composition of claim 1, wherein the polymeric emulsifiers comprise at least one nonionic polymeric emulsifier and at least one anionic polymeric emulsifier, wherein both the nonionic polymeric emulsifier and the anionic polymeric emulsifier have polyoxyalkylene units with at least 3 alkylene oxide units, and wherein the alkylene oxide units are ethylene oxide and/or propylene oxide units.

5. The paper coating composition of claim 4, wherein the nonionic polymeric emulsifier is selected from the group consisting of $C_{12}$- to $C_{14}$-fatty alcohol ethoxylates having a degree of ethoxylation of 3 to 20 ethylene oxide units, and copolymers of ethylene oxide and propylene oxide with a minimum content of 10% by weight of ethylene oxide.

6. The paper coating composition of claim 4, wherein the anionic polymeric emulsifier is selected from $C_1$- to $C_{15}$-esters of phosphoric acid ethoxylated with 4 to 20 ethylene oxide units.

7. The paper coating composition of claim 1, wherein no protective colloids are used as surface-active compounds.

8. A process for preparing a paper sheet having a coating layer, comprising coating a paper support material with a paper coating composition comprising from 50 to 99% by weight of the solids in the composition of one or more pigments, and from 1 to 50% by weight of the solids in the composition of a polymeric binder in the form of a polymer dispersion obtained by means of a radically initiated, aqueous emulsion polymerization, in the presence of one or more polymeric emulsifiers, of a) 60 to 97% by weight of vinyl acetate, b) 2 to 30% by weight of ethylene, c) 0.5 to 5% by weight of at least one ethylenically unsaturated silane monomer, and d) 0.5 to 5% by weight of at least one ethylenically unsaturated carboxylic acid comonomer, based in each case on the total weight of the monomers used for the polymerization, and the data in % by weight summing in each case to 100% by weight.

9. The process according to claim 8, wherein the ethylenically unsaturated silane monomer(s) c) is/are of the general formula $R^1SiR_{0-2}(OR^2)_{1-3}$, where R has the definition $CH_2{=}CR^3{-}(CH_2)_{0-1}$ or $CH_2{=}CR^3CO_2(CH_2)_{1-3}$, $R^2$ is a unbranched or branched, optionally substituted alkyl radical or acyl radical having 1 to 12 C atoms, which may optionally be interrupted by an ether group, and $R^3$ stands for H or $CH_3$.

10. The process according to claim 8, wherein the ethylenically unsaturated carboxylic acid comonomer(s) d) is/are ethylenically unsaturated monocarboxylic or dicarboxylic acids, or salts or anhydrides thereof.

11. The process according to claim 8, wherein the polymeric emulsifiers comprise at least one nonionic polymeric emulsifier and at least one anionic polymeric emulsifier, wherein both the nonionic polymeric emulsifier and the anionic polymeric emulsifier have polyoxyalkylene units with at least 3 alkylene oxide units, and wherein the alkylene oxide units are ethylene oxide and/or propylene oxide units.

12. The process according to claim 8, wherein the nonionic polymeric emulsifier is selected from the group of $C_{12}$- to $C_{14}$-fatty alcohol ethoxylates having a degree of ethoxylation of 3 to 20 ethylene oxide units, and copolymers of ethylene oxide and propylene oxide with a minimum content of 10% by weight of ethylene oxide.

13. The process according to claim 8, wherein the anionic polymeric emulsifier is selected from $C_1$- to $C_{15}$-esters of phosphoric acid ethoxylated with 4 to 20 ethylene oxide units.

14. The process according to claim 8, wherein no protective colloids are used as surface-active compounds.

* * * * *

UNITED STATES PATENT AND TRADEMARK OFFICE
CERTIFICATE OF CORRECTION

Page 1 of 1

PATENT NO.         : 9,803,101 B2
APPLICATION NO.    : 15/129247
DATED              : October 31, 2017
INVENTOR(S)        : Yong Hae Choi et al.

It is certified that error appears in the above-identified patent and that said Letters Patent is hereby corrected as shown below:

In the Claims

At Column 10, Lines 10-11, in Claim 9, "where R has the definition $CH_2=CR^3-(CH_2)_{0-1}$ or $CH_2=CR^3CO_2(CH_2)_{1-3}$" should read --where R has the definition $C_1$ to $C_3$ alkyl radical, $C_1$ to $C_3$ alkoxy radical or halogen, $R^1$ has the definition $CH_2=CR^3-(CH_2)_{0-1}$ or $CH_2=CR^3CO_2(CH_2)_{1-3}$--.

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*